Sept. 24, 1935.   E. B. PHILIPS   2,015,366
SLUICE GATE
Filed July 9, 1934   2 Sheets-Sheet 1

INVENTOR.
Erwin B. Philips.
BY
ATTORNEYS.

Sept. 24, 1935.  E. B. PHILIPS  2,015,366
SLUICE GATE
Filed July 9, 1934  2 Sheets-Sheet 2

INVENTOR.
Erwin B. Philips.
BY
ATTORNEYS.

Patented Sept. 24, 1935

2,015,366

UNITED STATES PATENT OFFICE 2,015,366

SLUICE GATE

Erwin B. Philips, Kenton, Ohio, assignor to Philips & Davies, Inc., Kenton, Ohio, a corporation of Ohio Application July 9, 1934, Serial No. 734,334

5 Claims. (Cl. 61—28)

My invention relates to sluice gates. It has to do, more particularly, with that type of sluice gate which is designed for use under water and which may be installed at comparatively great depths. It is especially applicable to the installations of sluice gates and dams wherein the gate must travel along an inclined slope in its approach to or departure from its closed position, although it is not necessarily limited thereto. It is especially desirable in conjunction with sluice gates which operate upon the up-stream side of a dam.

Gates of this type are ordinarily provided with anti-friction rollers or other anti-friction means to facilitate the actual opening and closing of the gate. From the moment that the gate starts to close the sluiceway until the sluiceway is substantially closed, the kinetic force of the water becomes a factor of great importance. It exerts a pressure upon the up-stream side of the gate and this pressure is in turn transmitted to the anti-friction rollers or other anti-friction means.

When the closing operation occurs at a comparatively great depth, the kinetic force of the water is immense and, in some cases, the water is passing through the sluiceway and against the gate at sixty miles per hour or more. Also, when the gate is closed, the hydrostatic pressure of the water thereon is frequently as great as four million pounds or more.

It is obvious that the anti-friction rollers or other means which are provided for minimizing the friction during actual closing or opening must be very highly finished and very accurate in diameter. This is particularly true, since it is not practicable to use rubber or other resilient sealing means with gates of this type, especially when they are used at a substantial depth below the surface of the pond. The ideal type of seal is metal-to-metal contact between the sealing face of the gate and the sealing face of the gate frame surrounding the sluiceway opening.

In order to obtain this metal-to-metal contact, as indicated, the anti-friction rollers must co-operate, during the closing and opening of the gate, with highly machined and accurate tracks which will be effective to maintain an absolutely parallel position between the sealing plane of the gate frame and the sealing plane of the gate so that a water-tight seal will be produced. Moreover, this cooperation must be maintained at as high a state of perfection as possible, in order to insure the maintenance of this parallel relation.

It will also be obvious that the maintenance of these anti-friction means at a high state of perfection is important in connection with their functions in minimizing the friction induced by the pressure of the water column upon the gate during the closing or opening operation. Injury to these anti-friction means might conceivably prevent the closing of the gate, with a consequent loss of the entire water supply of a city or other project for which the dam is provided. Such inability to close the gate has often resulted in enormous damage to the dam and its equipment.

The type of gate with which this invention is preferably utilized is illustrated in the patent to Broome, No. 1,306,370, of June 10, 1919, wherein the gate is lowered into closing position by tension supporting members and wherein the skin plate of the gate is inclined to a calculated extent so that the customary column of water above the gate at the time of closing will be effective in conjunction with the weight of the gate to positively move the gate to its closed position. Also, the tracks for the anti-friction means are in such converging relation to the sealing planes of the gate and gate frame that closing will be effected without sliding friction.

With this type of gate, it has been found possible to utilize one gate for a series of sluiceways in the dam, the gate being lifted to the top of the dam by a traveling hoist and transferred to a position above any one of such sluiceways. Where the gate is used as an emergency gate, it is kept at the top of the dam until such emergency arises. When the emergency does arise, however, the lowering of the gate into its closing position must ordinarily be effected quite rapidly. If, for example, the opening of the sluiceway is one hundred or more feet below the pond level, the problem of getting the gate to the position where it starts to close the sluiceway opening is a serious one.

If the anti-friction means are to be used for transporting the gate from the top of the dam along the inclined slope thereof to its approximate closing position, it is necessary that carefully finished tracks be provided for such anti-friction means at a comparatively great expense. Moreover, where the upper portions of the tracks are, from time to time, uncovered by the lowering of the water level in the pond, the accumulation of debris thereon becomes dry and hard, frequently being in the nature of barnacles or tubercules and, also, these portions of the tracks rust, thereby offering serious danger of injury to the anti-friction means.

The customary way of handling this problem is to build a tower projecting out into the pond on the up-stream side of the dam, so that the gate need not follow the inclination of the slope of the dam but may be lowered vertically or raised vertically to and from the closing and opening zone. However, this practice usually involves a cost of many thousand dollars.

Furthermore, where endless chain rollers are used as anti-friction means, these roller chains may weigh several thousand pounds. The rapid lowering of the gate for one hundred or more feet along a track at a comparatively high rate of speed with these roller chains in constant contact with the track, will cause the travel of such chains at a rate of speed which is bound to be harmful to the anti-friction means and, in fact, to be a serious source of danger.

When a gate of this type is used in connection with a turbine intake, the gate may be frequently closed and opened. Often, the user of the gate considers it desirable to raise the gate to the top of the dam whenever it is opened, for the purpose of avoiding vibration of the gate by the moving waters and also to facilitate frequent inspection of the gate. If the roller chains are relied upon for the duty of transporting the gate to and from the closing zone, the wear and tear upon these roller chains is necessarily greatly increased with a consequent great increase in liability of damage thereto and with a consequent great shortening of the lives thereof. This greatly multiplies the danger of leakage and increases the danger that the roller friction will become so great as to prevent closing of the gate under the pressure of the water column for which it has been calculated.

When a gate of this type is lowered from its position at the top of the dam to its zone of closing at a high rate of speed, such as in an emergency, it might tend to become displaced on the tracks or jump off of the tracks. This is especially true if the slope of the dam is steep and the tracks on which the gate operates are rough, due to rust or debris which has accumulated thereon, as previously stated. Therefore, it is important with gates of this type to provide means for preventing displacement of the gate on the tracks or jumping of the gate off of the tracks.

One of the objects of this invention is to provide a means whereby the anti-friction means which is used during the actual closing and opening of the gate may be preserved from injury so that it may perform the actual closing and opening operations with certainty and efficiency.

Another object of this invention is to provide a means for transporting the gate to and from its closing and opening zone without subjecting the anti-friction means to the undesirable stresses and dangers previously explained.

Another object of this invention is to provide a means for bringing the anti-friction means of the gate into proper relation to the guides, effective during the actual closing and opening operations, with facility and without injury to such anti-friction means or such guides.

Another object of this invention is to provide a means for transporting a gate of the type indicated along an inclined slope of a dam, either in its downward or its upward movement, in such a manner that swaying of the gate will be avoided.

Another object of my invention is to provide means for guiding the gate from a position at the top of the dam to a position in covering relation with a sluiceway formed in the dam, the gate being provided with means which cooperate with said guiding means for preventing displacement of the gate relative to the guiding means and for preventing the gate from jumping off of said guiding means.

In its preferred form, my invention contemplates the provision of a means for transporting the gate from the top of the inclined slope of a dam to the opening and closing zone without the use of the anti-friction means provided for actual closing and opening. Moreover, my invention is such that the said transporting means will deliver the gate to the closing and opening zone and will, thereupon, automatically cease to function when the anti-friction means have assumed effective cooperation with their guides. Furthermore, my invention is such that the anti-friction means will function effectively during the opening of the gate and, after such opening, will automatically return the gate to the transporting means, simultaneously removing all stress from the antifriction means.

More specifically, my invention contemplates the use of transporting tracks on the slope of the dam and gate-supporting wheels mounted on the gate for cooperation with said tracks while the gate is in the transporting zone. These transporting tracks extend into such juxtaposition to the guides provided for cooperation with the antifriction means that the lowering of the gate, with its wheels traveling on the transporting tracks, will ultimately result in bringing the anti-friction means into cooperative relation with their guides and in automatically transferring the weight of the gate from its transporting wheels to the antifriction means. Likewise, the raising of the gate from its closed position will ultimately again bring the transporting wheels into position to support the gate upon the transporting tracks and will, immediately thereafter, relieve the antifriction means from any stress whatever. I further provide on the gate itself one set of guard members which cooperate with the transporting tracks and a second set of guard members which cooperate with the guides for the anti-friction means, to prevent displacement of the gate on the transporting tracks or guides, or jumping of the gate therefrom.

The preferred embodiment of my invention is shown in the accompanying drawings wherein similar characters of reference designate corresponding parts and wherein.

Figure 8:
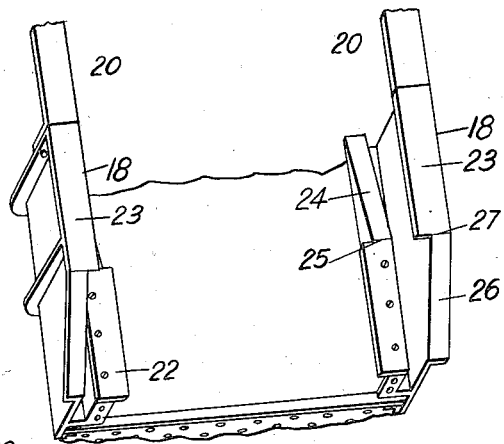

Figure 8 is a perspective view of the transition members used for connecting the transporting tracks to the anti-friction means guiding members With reference to the drawings, I have shown my invention applied to the slope of a dam D. This dam is provided with a sluiceway S which is disposed below the water level and which is adapted to be closed by a sluice gate 1. This sluice gate 1 is of the submerged type so that the water pressure will supplement the force of gravity to cause the closing movement of the gate, without exerting any downward pressure thereon by means of the gate-operating mechanism.

The gate 1 may be of any preferred type but, as shown in the drawings, this gate comprises side plates 2 which are suitably joined together. The gate is further provided with a face plate 3 which is suitably secured thereon at the up-stream side thereof.

The down-stream side of the gate is provided with an inclined sealing plane 4 which is suitably disposed thereon. This inclined sealing plane 4 is adapted to cooperate with the correspondingly inclined sealing frame 5 formed on the gate frame, which is disposed at the up-stream side of the sluiceway S. When the gate is in its lowermost position (Figure 4), the sealing planes 4 and 5 are adapted to firmly contact with each other to produce a water-tight seal. These sealing planes are composed of metal which is highly machined in order to obtain a water-tight contact.

It will be apparent hereinafter that both the sealing plane 4 on the gate and the sealing plane 5 on the gate frame are inclined relative to the path of movement of the gate. Thus, the gate will leave its seat at once on beginning the opening movement. Likewise, the gate will not again engage its seat until the closing movement is finally completed, so that sliding friction between the sealing plane on the gate and that on the gate frame is not present.

The gate is further provided with suitable means (not shown) by which it may be connected to hoisting mechanism arranged at the top of the dam. It will only be necessary to provide tension members for connecting the gate to the hoisting mechanism, since the gate will be moved towards closed position automatically due to its weight and the pressure exerted thereon by the water.

The gate is further provided at each side thereof with anti-friction means, comprising roller trains 6 which are suitably mounted thereon. As will be understood hereinafter, these roller trains operate on guides disposed adjacent the sluiceway and when the gate nears its closing position, the roller trains 6 support the weight of the gate and the water pressure upon the gate. Furthermore, these roller trains cooperate with the roller train guides in keeping the sealing plane 4 of the gate in parallel relation to the sealing plane 5 of the gate frame, so that sliding friction will not be present during the closing movement of the gate and so that the gate will firmly engage its seat at the end of the closing movement and a water-tight seal will be produced. It will be understood, however, that other forms of anti-friction devices may be employed instead of the roller trains 6.

Figure 2:
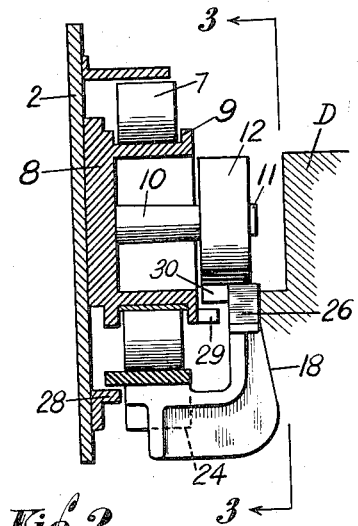
Figure 2 is an enlarged detail in section taken substantially on line 2—2 of Figure 1 and showing the lower end of one of the transition members used for connecting the transporting tracks to the anti-friction means guide members.

Each of these roller trains 6 comprises a series of rollers 7 which are connected together in a train by means of suitable links (not shown). The rollers 7 are preferably of material which is highly resistant to corrosion. These rollers are also very highly machined and very accurate in diameter. A casting 8 is suitably secured to each side plate 2 of the gate 1 and each of these castings extends substantially the entire length of the gate. Each of these castings is provided with a groove 9 (Figure 2) which extends around the entire periphery thereof. The roller trains 6 are adapted to move bodily around the castings 8 with the rollers 7 operating in the grooves 9.

Each of these castings 8 is further provided adjacent each end thereof with sleeve members 10 (Figure 7) which are formed integrally therewith. These sleeve members 10 are adapted to receive the stub axles 11 which have their inner ends secured therein in a suitable manner. The outer ends of the stub axles 11 have wheels 12 rotatably mounted thereon. These wheels 12 are provided with bronze bushings 13 which are mounted in the hubs thereof in a suitable manner. The wheels may also be provided with suitable oiling means (not shown).

Figure 1:
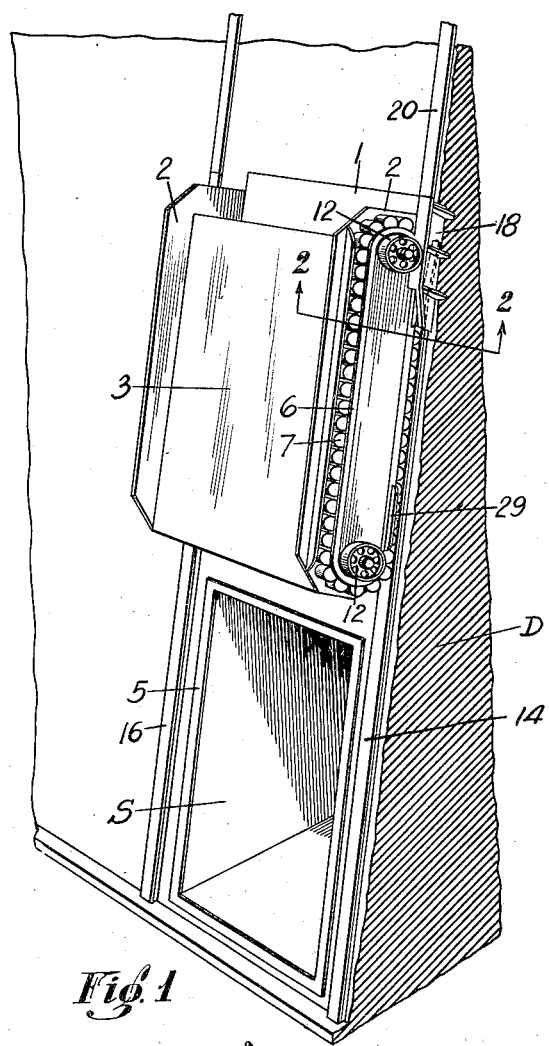
Figure 1 is a perspective view of a section of a dam, showing a sluiceway formed therein and showing a sluice gate installation, constructed in accordance with the principles of my invention, applied thereto, the sluice gate being shown in uncovering relation to the sluiceway.
Figure 7:
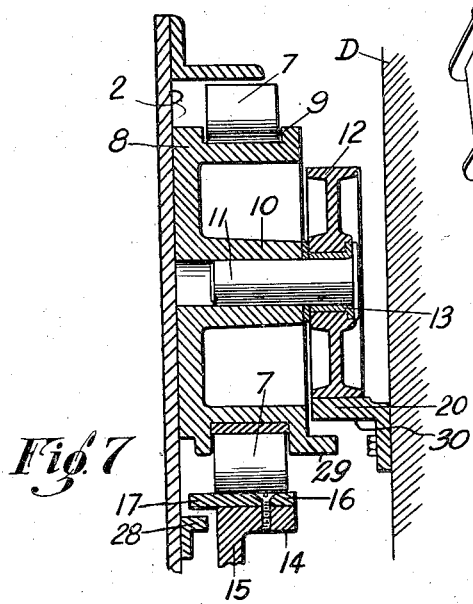
Figure 7 is a section, illustrating how the wheel members and anti-friction means are mounted on the gate and, illustrating more or less diagrammatically and not as a true section, how the one set of guard members on the gate cooperates with the transporting tracks any place therealong and another set of guard members cooperates with the anti-friction means guide members any place therealong.

The roller trains 6 are adapted to operate on roller train guide members 14 when the gate 1 is near its closing and opening zone. These guide members 14 are in the form of tracks which may be suitably secured to the slope of the dam. A section of one of these track members 14 is illustrated in Figure 7. Each of the tracks 14 comprises a body portion 15 having a strip of metal 16 secured thereon in a suitable manner. This strip of metal 16 projects past the inner side of the track a short distance as indicated at 17 to form an inwardly extending flange. The strips of metal 16 are preferably of a metal which is highly resistant to corrosion. Furthermore, the surface of this strip of metal is highly machined so that the roller trains 6 may operate thereon without injury to the rollers 7 and so that the gate will be properly seated on the gate frame when it moves into closed position. As shown in Figure 1 of the drawings, the tracks 14 for the roller trains are disposed at each side of the sluiceway and extend from a point below the gate to a point above the sluiceway. The tracks 14 preferably extend above the sluiceway a distance equal substantially to the length of the gate. Thus, the gate may be supported on the roller trains 6 which will rest on the tracks or guides 14, before the actual closing operation of the gate begins.

Figure 3:
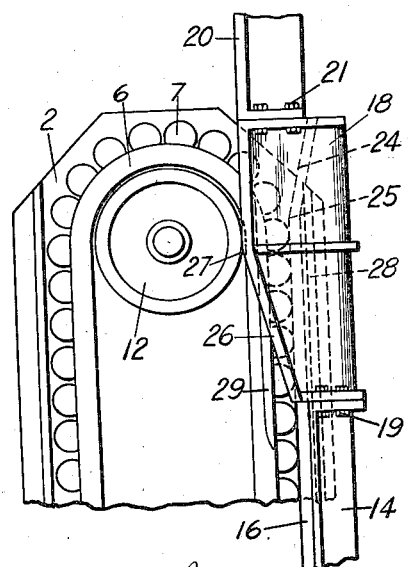
Figure 3 is a side elevation of a portion of the gate, taken substantially along line 3—3 of Figure 2.
Figure 5:
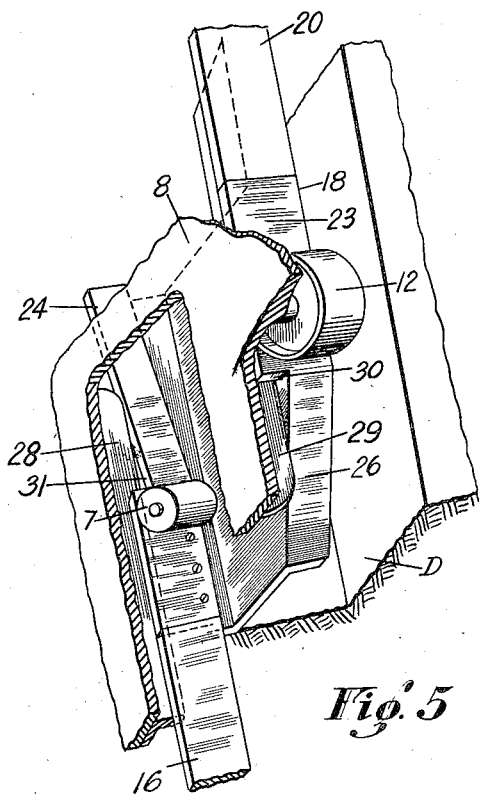
Figure 5 is a detail in perspective, partly broken away, of one of the transition members which are used for connecting the transporting tracks to the anti-friction means guide members, showing how this transition member is provided with cut-out portions to permit passage of the guard members which are provided on the gate.

The upper ends of the track members 14 are bolted to transition castings 18, as indicated at 19 in Figure 3. The upper ends of these transition members 18 are bolted to the lower ends of the transporting or wheel tracks 20, as indicated at 21. These wheel tracks 20 extend from the top of the dam to the transition members 18. These tracks 20 may be made of cast iron or of common steel bars or other inexpensive material. Furthermore, it is not necessary to machine the upper surface of these tracks, inasmuch as the roller trains 6 do not operate thereon, as will be understood hereinafter. The wheel tracks 20 are spaced apart a greater distance than the roller train tracks 14. Thus, the wheels 12 which are displaced on the gate laterally from the roller trains 6 will operate on these tracks 20, but the roller trains will not. The gate will pass upwardly between these tracks 20.

The transition members 18 are preferably cast of a single piece. They are provided for connecting the roller train tracks or guides 14 to the wheel tracks or transporting tracks 20. They are of such a nature that the weight of the gate will be transferred from one set of tracks to the other in a very efficient manner and without injury to the roller trains. Each of these transition members comprises an inner portion 22 and an outer portion 23. The inner portion 22 of the transition member is the same height as the track 14 to which it is connected and in reality serves as a continuation of such track 14. The strip of highly finished metal 16 disposed on the upper surface of track 14 is extended up over the inner portion 22 of the transition casting. The outer portion 23 of the transition castings is of the same height as the track 20 to which it is connected and in reality serves as a continuation of such track.

Figure 6:
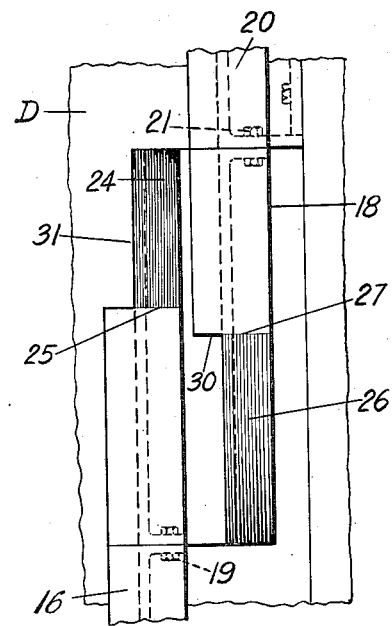
Figure 6 is a plan view of one of the transition members, showing it connected to the transporting tracks and the anti-friction means guide member.

The portion 22 of each of the transition castings 18 is provided with an inclined section 24. This inclined section 24 extends upwardly along the slope of the dam but is inclined inwardly towards the surface of the dam from a point 25 to a point at the upper end of portion 22. The outer portion 23 of the transition member is provided with an inclined section 26. This inclined section 26, however, extends downwardly along the slope of the dam and is also inclined inwardly towards the surface of the dam from a point 27 to a point adjacent the lower end of the transition casting. The point 25 of the transition member is preferably disposed slightly further upwardly towards the upper end of the transition member as indicated in Figures 3 and 6 for a purpose which will be understood hereinafter.

I also provide means for preventing the gate from being displaced on the roller train tracks 14 and the wheel tracks 20, or from jumping off either set of tracks. For this purpose, as indicated in Figures 2, 3, 5 and 7, each side plate 2 of the gate is provided adjacent its lower edge with a guard member 28. This guard member 28 is suitably secured to the side plate and projects outwardly therefrom. It may extend substantially the entire length of the gate. One of these guard members will be disposed on each side of the gate and is adapted to project beneath the inwardly extending flange 17 formed on each of the roller train tracks 14. It will be apparent that these guard members will prevent the gate from jumping from the roller train tracks 14. Also, the outer edges of the guard members 28 cooperate with the inner edges of the body portions of the tracks 14 to prevent lateral displacement of the gate on said tracks.

In order to prevent the gate from being displaced on the wheel tracks 20, or to jump off of said tracks, I provide a second set of guard members. This second set of guard members embodies the guard members 29 which are comparatively short and one of which is formed adjacent each end of the casting 8 and integral therewith. These guard members 29 are formed on the lower edge of the casting and project outwardly therefrom. They are adapted to fit beneath an inwardly extending flange 30 formed on the wheel tracks 20. These guards 29 will cooperate with the flanges 30 on the wheel tracks and will prevent the gate from jumping off of such tracks. As will be apparent from Figures 2 and 7, the outer edge of the lower portion of casting 8 will cooperate with the inner edge of the flange 30 of wheel tracks 20 to prevent lateral displacement of the gate on these tracks.

In order to permit movement of the gate up and down, past the transition member 18, the transition castings must be provided with cut-out portions to permit passage of the outwardly projecting guard members on the gate without interfering with the inwardly projecting flanges on the roller train tracks and the wheel tracks, portions of which are formed on said transition members. Thus, in Figures 5, 6 and 7, I show that the flange formed by the strip 16 on the portion 22 of the transition casting is cut away from the point 25 to the upper end of the transition casting, as indicated at 31. Thus, the inclined section 24 of the roller train track which is formed on the transition member, will have the inwardly projecting flange eliminated. Consequently, as will be apparent from Figure 5, this will permit passage of the guard member 28 without interference therewith.

In order to permit the guard members 29, which fit under the flange 30 on the wheel tracks, to pass the inclined portion 26 of the wheel track formed on the outer portion of the transition member, the flange 30 is cut away from the point 27 to the lower end of the transition member. Consequently, the guard members 29 will be permitted to pass by these inclined sections 26 of the wheel tracks. Thus, it will be apparent that the guard members 29 will always cooperate with the wheel tracks when the gate is operating thereon, to prevent jumping of the gate from the wheel tracks. The guard members 28 will cooperate with the roller train tracks when the gate is operating thereon to prevent jumping of the gate from the roller train track. Furthermore, because the inclined portions of both the wheel tracks and the roller train tracks formed on the transition members have their flanges cut away, passage of the guard members will be permitted without interference therewith.

Figure 4:
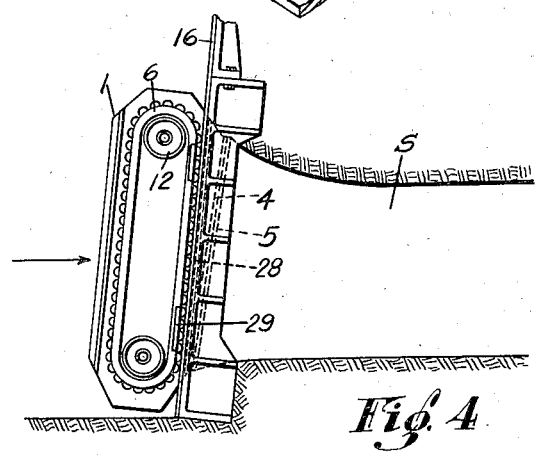
Figure 4 is a side elevation of the gate, showing it in closed position and showing the inclined sealing plane on the gate and the cooperating inclined sealing plane on the gate frame.

In the operation of my sluice gate, assuming that the gate is in closed position, the sealing plane 4 on the gate and the sealing plate 5 on the gate frame will be firmly in contact with each other, as indicated in Figure 4, thereby closing the sluiceway S. In this position, the rollers 7 of the roller train 6 will be resting on the upper machined surface of the roller train tracks 14. In order to open the gate, the hoisting mechanism is operated to draw the gate 1 upwardly. In the initial upward movement of the gate, the surfaces 4 and 5 will quickly move away from each other since they are inclined with relation to the path of movement of the gate. Furthermore, in this initial movement, the roller train 6 will operate on the tracks 14 and, since the upper surfaces of these tracks are machined and are made of material resistant to corrosion, there will be no danger of injuring the roller trains, even though the weight of the gate and the pressure of the water thereon are very great. The guard members 28 will cooperate with the tracks 14 to prevent jumping of the gate off the track 14.

Continued upward movement of the gate 1 causes the upper ends of the roller trains to reach a position where a portion of the rollers 7 will rest on the upper surfaces of the lower ends of portions 22 of the transition members 18. At this point, the wheels 12 at the upper end of the gate will occupy a position over the inclined portions 26 of the outer portions 23 of the transition members. Further movement of the gate causes the rollers to move along the portions 22 until they reach the point 25, where they will start down the inclined portions 24. At this point, the wheels 12 at the upper end of the gate will have reached the upper ends of the inclined portions 26 and will be operating on the upper surfaces of the portions 23 of the transition members and will operate thereon until they reach the main portions of the wheel tracks 20. Since the point 25 is disposed above the point 27, this will insure that the upper end of the gate will be supported by the wheels 12 before the rollers 7 leave the roller train tracks. As the gate moves further, the rollers will continue to leave the portions 22 until the wheels 12, on the lower end of the gate, reach the portions 23 of the transition members and, thereafter, the entire weight of the gate will be supported on the wheels 12 which will be operating on the wheel tracks. So long as the gate operates on the wheel tracks, the guard members 29 will cooperate therewith to prevent displacement of the gate.

When it is desired to close the gate, the hoisting mechanism is operated to allow the gate to move downwardly. During the travel of the gate from its uppermost position towards its closing position, it will be supported on the wheels 12 which will operate on the wheel tracks 20. The guard members 29 will prevent jumping of the gate from the tracks no matter how fast the gate is lowered and no matter how steep the slope of the dam is. Also, the edges of the casting 8 will prevent lateral displacement of the gate and injury to the roller trains by contact with the wheel tracks 20.

When the gate moves downwardly to the location of the transition members 18, the roller 7 at the lowermost end of the roller train 6 will begin to move up the inclined sections 24 of the inner portions 22 of the transition members. They will reach the points 25 and then begin to operate on the upper surfaces of the portions 22 of the transition members. Shortly thereafter, the lowermost wheels 12 will reach the points 27 and will leave portions 23 of the transition members. Since the points 27 are disposed below the points 25, the wheels 12 at the lower end of the gate will not leave the wheel tracks until after the rollers on the roller trains begin to operate on the roller train tracks. Thereafter, the rollers will operate on the roller tracks and the wheels 12 will be inoperative. After the gate has moved further downwardly, the uppermost wheels 12 will leave the wheel tracks and the entire weight of the gate will be supported on the roller trains which will thereafter operate on the roller train tracks. As the gate moves downwardly on the roller train tracks 14, the guard members 28 cooperate therewith to prevent the gate from jumping the tracks and to prevent lateral displacement of the gate.

The gate will continue to move downwardly toward the sluiceway. The roller train 6 and cooperating tracks 14 will maintain the sealing planes 4 and 5 in parallel relation so that there will be no sliding friction generated between these planes during the actual closing movement of the grate. When the gate is finally in closed position, the sealing planes 4 and 5 will be firmly in contact with each other (Figure 4).

It will be understood from this that as the gate moves upwardly to a certain point, at the transition member, the wheels 12 on the upper end of the gate will move into contact with the wheel tracks and shortly thereafter the rollers on the upper end of the gate will begin to move out of contact with the roller tracks. In the lowering operation of the gate, the rollers at the lower end of the gate will begin operating on the roller tracks and the wheel 12 at the lower end of the gate will leave the wheel tracks an instant later.

Thus, it will be obvious that the roller trains merely come into operation when the gate nears its zone of actual closing and opening. During the greater portion of the time, when the gate is being transported from its normal position at the top of the dam to its lowermost closing position, the roller trains are inoperative. The result of this arrangement is that the roller trains come into contact only with a highly machined surface for which they were designed and are not called upon to serve any other function than to prevent friction during the actual closing operation of the gate. All travel of the gate from its uppermost position to point adjacent the sluiceway is accomplished by the wheels operating on their tracks, thereby protecting the roller trains against damage which might occur if the gate were transported from the top of the dam by means of the roller trains themselves.

Since the roller trains do not support the gate on the long section of tracks between the upper edge of the dam and a point near the sluiceway, these tracks may be made of cast iron or common steel bars. Furthermore, these tracks need not be machined, which is an expensive operation. Then, too, if barnacles, tubercules or other foreign matter collects on these tracks, the roller trains will not be injured, since the weight of the gate is supported by the wheels on the tracks.

It will further be apparent from the above description that I provide very efficient means for connecting the wheel tracks to the roller train tracks. This means embodies the transition members which have part of the roller train track formed thereon and part of the wheel tracks formed thereon. These transition members are of such a type that the weight of the gate will be quickly and effectively transferred from one set of tracks to the other without danger of injury to the gate or the roller trains. Also, it will be apparent that guard members are provided for preventing displacement or jumping of the gate from the wheel tracks or the roller train tracks and that the transition members are so formed as to permit passage of the guard members.

The term "deep-water sluice gate," as used in the claims, is intended to refer to that type of sluice gate wherein the gate, when in closed posion, closes the opening of a sluiceway whose upper edge is spaced below the water level.

This application is a continuation in part of application Serial No. 632,672, filed September 12, 1932.

Having thus described my invention, what I claim is:

1. In combination, a sluice gate supported for raising and lowering along the face of a dam relative to a sluiceway, means for guiding the sluice gate to a closed or open position with respect to the sluiceway, said means including a set of wheels carried by the gate at each side thereof, a set of roller trains carried by the gate at each side thereof, wheel tracks mounted on the face of the dam extending from a point a considerable distance above the sluiceway to a point adjacent the sluiceway, roller train tracks mounted on the face of the dam extending from a point adjacent the lower ends of said wheel tracks to a point adjacent the lower edge of the sluiceway, said wheels on the gate being disposed outside of the roller trains on the gate and said wheel tracks being spaced apart a slightly greater distance than the roller train tracks so that the gate and the roller trains carried thereby will pass between the wheel tracks, and means carried on each side of the gate adapted to contact with the inner and under side of the tracks to prevent the gate from leaving the tracks.

2. In combination, a sluice gate supported for raising and lowering along the face of a dam relative to a sluiceway, means for guiding the sluice gate to a closed or open position with respect to the sluiceway, said means including laterally spaced transporting members carried by the gate, laterally spaced anti-friction devices carried by the gate, guiding members mounted on the face of the dam extending from a point a considerable distance above the sluiceway to a point adjacent the sluiceway, other guiding means mounted on the face of the dam extending from a point adjacent the lower ends of said guiding members to a point adjacent the lower edge of the sluiceway, a set of laterally spaced guard members carried by the gate cooperating with said guiding members for preventing the gate from leaving said guiding members, and a second set of laterally spaced guard members carried by the gate cooperating with said other guiding means for preventing the gate from leaving said guiding means.

3. In combination, a sluice gate supported for raising and lowering along the face of a dam relative to a sluiceway, means for guiding the sluice gate to a closed or open position with respect to the sluiceway, said means including laterally spaced transporting members carried by the gate, laterally spaced antifriction devices carried by the gate, transporting tracks mounted on the face of the dam extending from a point a considerable distance above the sluiceway to a point adjacent the sluiceway, other tracks mounted on the face of the dam extending from a point adjacent the lower ends of said transporting tracks to a point adjacent the lower edge of the sluiceway, said transporting tracks and said other tracks having flanges formed thereon, a set of laterally spaced guard members carried by the gate projecting beneath the flanges of said transporting tracks for preventing the gate from leaving such tracks, and a second set of laterally spaced guard members carried by the gate projecting beneath the flanges on said other tracks for preventing the gate from leaving said other tracks.

4. In combination, a sluice gate supported for raising and lowering along the face of a dam relative to a sluiceway, means for guiding the sluice gate to a closed or open position with respect to the sluiceway, said means including laterally spaced transporting members carried by the gate, laterally spaced anti-friction devices carried by the gate, transporting tracks mounted on the face of the dam extending from a point a considerable distance above the sluiceway to a point adjacent the sluiceway, other tracks mounted on the face of the dam extending from a point adjacent the lower ends of said transporting tracks to a point adjacent the lower edge of the sluiceway, the lower ends of said transporting tracks overlapping the upper ends of said other tracks, the overlapping portions of said transporting tracks and said other tracks having sections inclined relative to the main portions of the tracks, said transporting tracks and said other tracks having flanges formed thereon substantially throughout their lengths, a set of laterally spaced guard members on said gate adapted to extend beneath the flanges on said transporting tracks for preventing the gate from leaving such tracks, and a second set of laterally spaced guard members on said gate adapted to extend beneath the flanges of said other tracks for preventing the gate from leaving said other tracks, the inclined sections of said transporting tracks and of said other tracks having the flanges thereof cut away to permit passage of the respective complemental guard members.

5. In combination, a sluice gate supported for raising and lowering along the face of a dam relative to a sluiceway, means for guiding the sluice gate to a closed or open position with respect to the sluiceway, said means including laterally spaced transporting members carried by the gate, laterally spaced anti-friction devices carried by the gate, transporting tracks mounted on the face of the dam extending from a point a considerable distance above the sluiceway to a point adjacent the sluiceway, other tracks mounted on the face of the dam in substantial alignment with said transporting tracks and extending from a point adjacent the lower ends of said transporting tracks to a point adjacent the lower edge of the sluiceway, transition members for connecting said transporting tracks to said other tracks, each of said transition members having a section of the transporting track and a section of the other track formed thereon, said transporting tracks and said other tracks having flanges formed thereon substantially throughout their length, a set of laterally spaced guard members on said gate projecting beneath the flanges of said transporting tracks for preventing the gate from leaving such tracks, and a second set of laterally spaced guard members on the gate projecting beneath the flanges of said other tracks for preventing the gate from leaving said other tracks, the section of said transporting tracks and of said other tracks of the transition members having the flanges thereof cut away to permit passage of the respective complemental guard members.

ERWIN B. PHILIPS.